United States Patent
Barnard (10) Patent No.: US 6,434,521 B1
(45) Date of Patent: Aug. 13, 2002

(54) AUTOMATICALLY DETERMINING WORDS FOR UPDATING IN A PRONUNCIATION DICTIONARY IN A SPEECH RECOGNITION SYSTEM

(75) Inventor: Etienne Barnard, Sommerville, MA (US)

(73) Assignee: SpeechWorks International, Inc., Boston, MA (US)

( * ) Notice: Subject to any disclaimer, the term of this patent is extended or adjusted under 35 U.S.C. 154(b) by 0 days.

(21) Appl. No.: 09/344,164

(22) Filed: Jun. 24, 1999

(51) Int. Cl.$^7$ .......................... G10L 15/06; G10L 15/10
(52) U.S. Cl. ........................................ 704/244; 704/254
(58) Field of Search .................................. 704/244, 254

(56) References Cited

U.S. PATENT DOCUMENTS

| | | | |
|---|---|---|---|
| 5,170,432 A | | 12/1992 | Hackbarth et al. |
| 5,710,864 A | | 1/1998 | Juang et al. |
| 5,933,804 A | * | 8/1999 | Huang et al. ............... 704/244 |
| 6,208,964 B1 | * | 3/2001 | Sabourin .................... 704/244 |

FOREIGN PATENT DOCUMENTS

EP  0392537  10/1990

OTHER PUBLICATIONS

281–286: "A New Approach to Speaker Adaptation by Modelling Pronuciation in Automatic Speech Recognition," Speech Communication, NL, Elsevier Science Publishers, Amsterdam, vol. 13, No. 3/04, Dec. 1, 1993.

864–867: Imai T et al: "A New Method for Automatic Generation of Speaker–Dependent Phonological Rules," Proceedings of the International Conference on Acoustics, Speech, and Signal Processign (ICASSP), US, New York, IEEE, May 9, 1995.

43–54: Pister–Bourjot, C. et al.: "Automatic learning: an approach to the adapatation of a speech recognition system to one or several speakers," Speech Communication, Mar. 1987, Netherlands, vol. 6, No. 1.

119–126: McInnes, F.R., et al: "Template Adaptation in an isolated Word–Recognition System," IEE Proceedings I. Solid–State & Electron Devices, GB, Institution of Electrical Engineers, Stevenage, vol. 136, No. 2, Apr. 1, 1989.

\* cited by examiner

Primary Examiner—Tālivaldis Ivars Šmits
(74) Attorney, Agent, or Firm—Hale and Dorr LLP (57) ABSTRACT

An approach for automatically determining the accuracy of a pronunciation dictionary in a speech recognition system involves comparing an expected pronunciation representation for a particular word from a pronunciation dictionary to one or more actual pronunciations of the particular word. An accuracy score for each of the phonemes that constitute the pronunciation of the particular word is determined from the comparison of the expected and actual pronunciations for the particular word. The accuracy score is evaluated against specified accuracy criteria to determine whether the expected pronunciation for the particular word satisfies the specified accuracy criteria. If the expected pronunciation does not satisfy the specified accuracy criteria for the particular word, then the expected pronunciation for the particular word in the pronunciation dictionary is identified as requiring updating. Manual or automated update mechanisms may then be employed to update the identified expected pronunciation representations to reflect the actual pronunciations.

12 Claims, 6 Drawing Sheets

| | PHONEME | SCORE FOR FIRST ACTUAL PRONUNCIATION | SCORE FOR SECOND ACTUAL PRONUNCIATION | SCORE FOR THIRD ACTUAL PRONUNCIATION | AVG SCORE | AVG SCORE THRESHOLD | MIN SCORE THRESHOLD | NUMBER OF SCORES BELOW MINIMUM SCORE THRESHOLD |
|---|---|---|---|---|---|---|---|---|
| )2→ | P1 | .90 | .80 | .67 | .79 | .50 | .30 | 0 |
| 4→ | P2 | .42 | .63 | .37 | .47 | .50 | .30 | 0 |
| 6→ | P3 | .95 | .91 | .93 | .93 | .50 | .30 | 0 |
| 8→ | P4 | .98 | .21 | .85 | .68 | .50 | .30 | 1 |
| 0→ | P5 | .28 | .26 | 1.00 | .51 | .50 | .30 | 2 |

AUTOMATICALLY DETERMINING WORDS FOR UPDATING IN A PRONUNCIATION DICTIONARY IN A SPEECH RECOGNITION SYSTEM

FIELD OF THE INVENTION

The invention relates generally to speech recognition systems, and relates more specifically to an approach for evaluating the accuracy of a pronunciation dictionary in a speech recognition system.

BACKGROUND OF THE INVENTION

Most speech recognition systems use a pronunciation dictionary to identify particular words contained in received utterances. The term "utterance" is used herein to refer to one or more sounds generated either by humans or by machines. Examples of an utterance include, but are not limited to, a single sound, any two or more sounds, a single word or two or more words. In general, a pronunciation dictionary contains data that defines expected pronunciations of utterances. When an utterance is received, the received utterance, or at least a portion of the received utterance, is compared to the expected pronunciations contained in the pronunciation dictionary. An utterance is recognized when the received utterance, or portion thereof, matches the expected pronunciation contained in the pronunciation dictionary.

One of the most important concerns with pronunciation dictionaries is to ensure that expected pronunciations of utterances defined by the pronunciation dictionary accurately reflect actual pronunciations of the utterances. If an actual pronunciation of a particular utterance does not match the expected pronunciation, the expected pronunciation of the particular utterance may no longer be useful for identifying the actual pronunciation of the particular utterance.

Actual pronunciations of utterances can be misrepresented for a variety of reasons. For example, in fluent speech, some sounds may be systematically deleted or adjusted. An application may be installed across diverse geographic areas where users have different regional accents. Expected pronunciations tend to be somewhat user-dependent. Consequently, a change in the users of a particular application can adversely affect the accuracy of a speech recognition system. This is attributable to different speech characteristics of users, such as different intonations and stresses in pronunciation.

Conventionally, pronunciation dictionaries are updated manually to reflect changes in actual pronunciations of utterances in response to reported problems. When a change in an application or user prevents a speech recognition system from recognizing utterances, the problem is reported to the administrator of the speech recognition system. The administrator then identifies the problem utterances and manually updates the pronunciation dictionary to reflect the changes to the application or users.

Manually updating a pronunciation dictionary to reflect changes to an application or users has several significant drawbacks. First, it relies upon problems being reported to the administrator of the speech recognition system. Problems may exist for long periods of time before being reported. In some situations this can adversely affect the reputation of the enterprise using the speech recognition system.

Furthermore, even after the problems are identified, a significant amount of human resources and may be required to update the pronunciation dictionary, further extending the problem. For example, updating the pronunciation dictionary typically involves collecting a large amount of actual pronunciation data for the problem utterances. The actual pronunciation data is then processed and used to update the expected pronunciation data contained in the pronunciation dictionary. Meanwhile, the speech recognition system is unable to recognize the problem utterances until the system is updated, which can be very frustrating to customers and other users of the system.

Based on the foregoing, there is a need for an automated approach for determining the accuracy of a pronunciation dictionary in a speech recognition system.

There is a particular need for an automated approach for determining the accuracy of a pronunciation dictionary in a speech recognition system that identifies particular expected pronunciation representations that do not satisfy specified accuracy criteria and therefore need to be updated.

There is a further particular need for an automated approach for determining the accuracy of a pronunciation dictionary in a speech recognition system that requires a reduced amount of human resources in the identification process.

SUMMARY OF THE INVENTION

The foregoing needs, and other needs and objects that will become apparent from the following description, are achieved by the present invention, which comprises, in one aspect, a method for determining the accuracy of a pronunciation dictionary in a speech recognition system. According to the method, an expected pronunciation representation for a particular utterance is retrieved from the pronunciation dictionary. Then, an accuracy score is generated for the expected pronunciation representation by comparing the expected pronunciation representation to a set of one or more actual pronunciations of the particular utterance.

According to another aspect, a method is provided for automatically updating a pronunciation dictionary in a speech recognition system to reflect one or more changes to an actual pronunciation of a particular word that is represented in the pronunciation dictionary. According to the method, an expected pronunciation representation for the particular word is retrieved from the pronunciation dictionary. An accuracy score is generated for the expected pronunciation representation by comparing the expected pronunciation representation to one or more actual pronunciations of the particular word. A determination is made whether the accuracy score for the expected pronunciation representation satisfies specified accuracy criteria. If the accuracy score for the expected pronunciation representation does not satisfy the specified accuracy criteria, then the expected pronunciation representation is updated to reflect the one or more actual pronunciations.

According to another aspect, a speech recognition apparatus is provided. The speech recognition apparatus comprises a storage medium having a pronunciation dictionary stored thereon and a diagnostic mechanism communicatively coupled to the storage medium. The diagnostic mechanism is configured to retrieve an expected pronunciation representation for a particular utterance from the pronunciation dictionary. The diagnostic mechanism is further configured to generate an accuracy score for the expected pronunciation representation by comparing the expected pronunciation representation to a set of one or more actual pronunciations of the particular utterance.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of example embodiments are described in more detail in the following sections: (1) introduction; (2) system overview; (3) pronunciation representation; (4) determining the accuracy of a pronunciation dictionary; and (5) implementation mechanisms.

1. Introduction

An approach for automatically determining the accuracy of a pronunciation dictionary in a speech recognition system is described. In general, an expected pronunciation representation for a particular utterance from a pronunciation dictionary is compared to actual pronunciations of the particular utterance. An accuracy score for the particular utterance is determined from the comparison of the expected and actual pronunciations of the particular utterance. The accuracy score is evaluated against specified accuracy criteria to determine whether the expected pronunciation for the particular utterance satisfies the specified accuracy criteria. If the expected pronunciation does not satisfy the specified accuracy criteria for the particular utterance, then the expected pronunciation for the particular utterance in the pronunciation dictionary is identified as requiring updating. Manual or automated update mechanisms may then be employed to update the identified expected pronunciation representations to reflect the actual pronunciations.

2. System Overview

Figure 1:
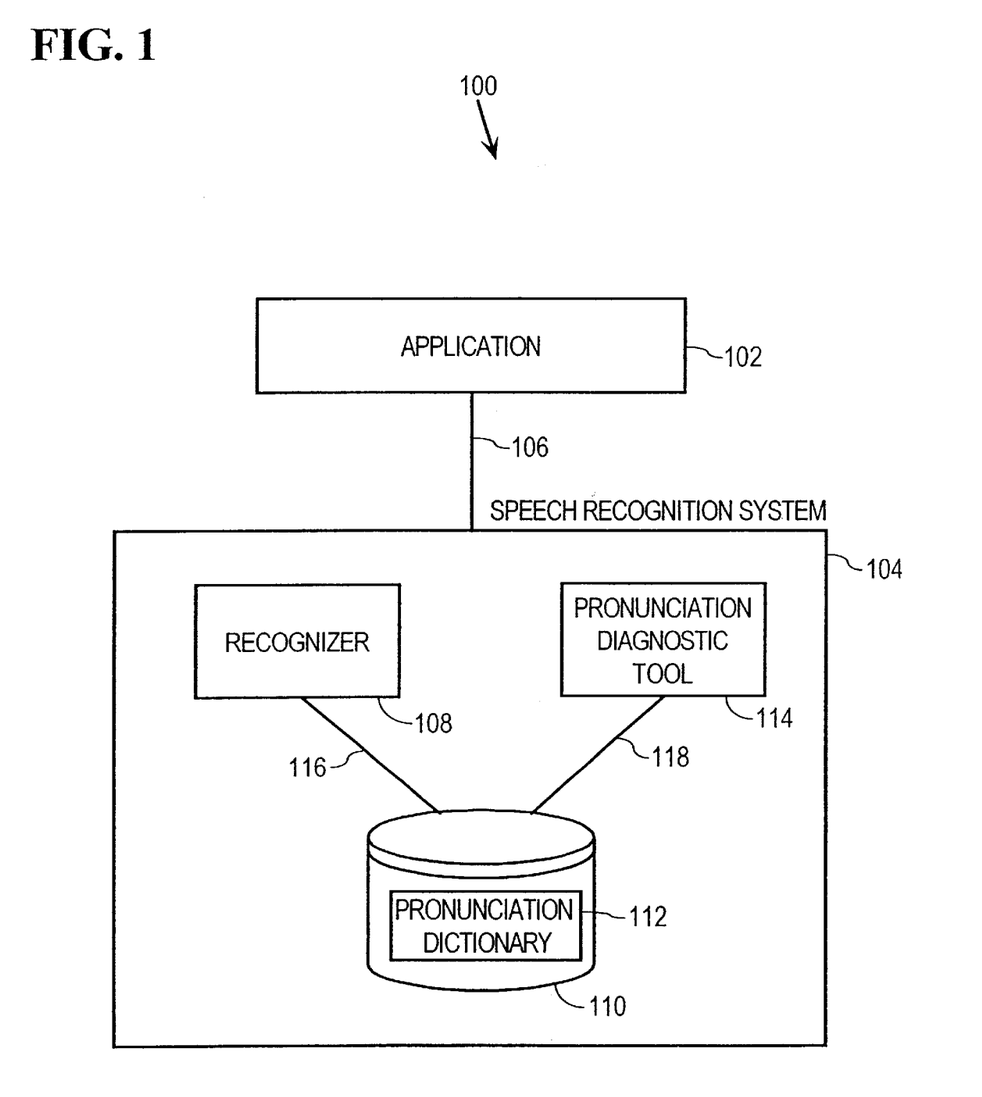
FIG. 1 is a block diagram of a system for automatically determining the accuracy of a pronunciation dictionary in a speech recognition system according to an embodiment.

FIG. 1 illustrates a system 100 used herein to describe various aspects and features of the invention. System 100 includes an application 102 that interacts with a speech recognition system (SRS) 104. Application 102 is any element that uses the speech recognition services of SRS 104. Examples of application 102 include, but are not limited to, a voice-activated system or a telephone-based service implemented in the form of one or more computer programs or processes. Application 102 is communicatively coupled to SRS 104 by a link 106.

SRS 104 includes a recognizer 108, a non-volatile storage 110, containing a pronunciation dictionary 112 and a pronunciation diagnostic tool 114. Recognizer 108 is communicatively coupled to non-volatile storage 110 by a link 116. Diagnostic tool 114 is communicatively coupled to non-volatile storage 110 by a link 118. Links 116, 118 may be implemented using any mechanism to provide for the exchange of data between their respective connected entities. Examples of links 116, 118 include, but are not limited to, network connections, wires, fiber-optic links and wireless communications links. Non-volatile storage 110 may be, for example, one or more disks.

Recognizer 108 is a mechanism that is configured to recognize received utterances using pronunciation dictionary 112. Recognizer 108 may also require interaction with other components in SRS 104 that are not illustrated or described herein so as to avoid obscuring the various features and aspects of the invention.

Pronunciation dictionary 112 contains data that defines expected pronunciations for utterances that can be recognized by SRS 104. Pronunciation dictionary 112 is described in more detail in this document.

According to an embodiment, pronunciation diagnostic tool 114 is configured to automatically determine the accuracy of pronunciation dictionary 112 and identify particular expected pronunciations that do not satisfy specified accuracy criteria. The expected pronunciations that do not satisfy the specified accuracy criteria may then be updated to more accurately reflect the actual pronunciations of received utterances.

SRS 104 may include other components not illustrated and described herein to avoid obscuring the various aspects and features of the invention. For example, SRS 104 may include various software development tools and application testing tools available to aid in the development process. One such tool is a commercially-available package of reusable speech software modules known as DialogModules™, provided by Speechworks International, Inc. of Boston, Mass.

3. Pronunciation Representation

Figure 2A:
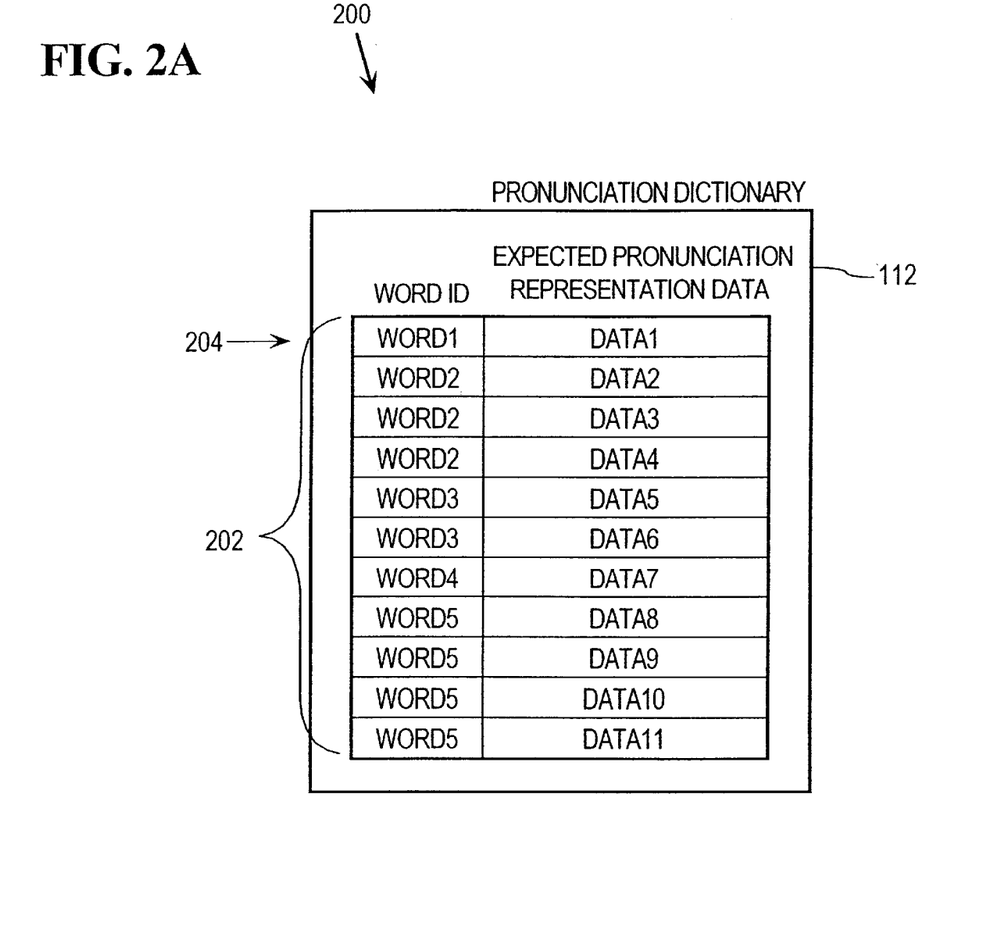
FIG. 2A is a block diagram illustrating a portion of the contents of a pronunciation dictionary according to an embodiment.

FIG. 2A is a block diagram 200 that illustrates an example implementation of pronunciation dictionary 112. Other implementations of pronunciation dictionary 112 may be used and the invention is not limited to any particular implementation of pronunciation dictionary 112.

For purposes of explanation, various embodiments are described herein in the context of recognizing words. However, embodiments of the invention are applicable to any type of utterance. In the present example, pronunciation dictionary 112 contains one or more entries 202, each of which corresponds to a particular expected pronunciation for a particular word. Each entry 202 includes a word identifier value and expected pronunciation representation data.

A word identifier value is any data that specifies a particular word with which an entry 202 is associated. For example, a word identifier may be the actual word with which a particular entry 202 is associated, such as "CAROUSEL," "APPLE" or "ZOO." As another example, a word identifier value may be data other than the word itself, such as WORD1 or WORD2, that allows an entry 202 to be mapped to a particular word. The invention is not limited to any particular implementation of word identifier values.

Expected pronunciation representation data is any data that specifies an expected pronunciation for the word associated with the entry that contains the expected pronunciation representation data. According to one embodiment, expected pronunciation representation data specifies one or more phonemes, also referred to herein as a "phoneme string." As used herein, the term "phoneme" refers to the smallest distinguishable sound in a dialect of a language.

Figure 2B:
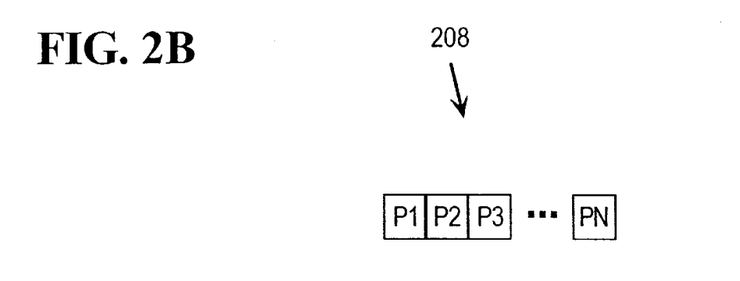
FIG. 2B is a block diagram illustrating the contents of a phoneme string configuration according to an embodiment.

For example, entry 204 is associated with word identifier value WORD1 and contains expected pronunciation representation data DATA1 that defines an expected pronunciation for WORD1. FIG. 2B is a block diagram that illustrates an example phoneme string 208 for DATA1 according to an embodiment. Phoneme string 208 includes N number of phonemes, identified as P1, P2, P3 through PN. Phoneme string 208 defines an expected pronunciation for WORD1. Phoneme string 208 may contain any number of phonemes and the invention is not limited to phoneme strings of any particular length.

As illustrated in FIG. 2, some words in pronunciation dictionary 212, such as WORD1 and WORD4, have only a single entry 202 and therefore only a single expected pronunciation. Other words have multiple expected pronunciations. For example, WORD2 has three entries 202 and therefore three expected pronunciations. WORD3 has two expected pronunciations and WORD5 has four expected pronunciations. Thus, pronunciation dictionary 112 may specify any number of pronunciations for any number of words and the invention is not limited to pronunciation dictionaries having any number of words or any number of expected pronunciations for a particular word.

4. Determining the Accuracy of a Pronunciation Dictionary

According to one embodiment, the accuracy of pronunciation dictionary 112 is automatically determined by comparing a first set of phoneme strings contained in pronunciation dictionary 112, which represent expected pronunciations of words, to actual pronunciations of the words. Phoneme strings contained in the pronunciation dictionary are scored for accuracy based upon the comparison to the actual pronunciations. The accuracy scores are evaluated against specified accuracy criteria to identify phoneme strings contained in the pronunciation dictionary that need to be updated to more accurately reflect actual pronunciations.

A. COMPARING EXPECTED AND ACTUAL PRONUNCIATIONS USING PHONEME STRINGS

Figure 3A:
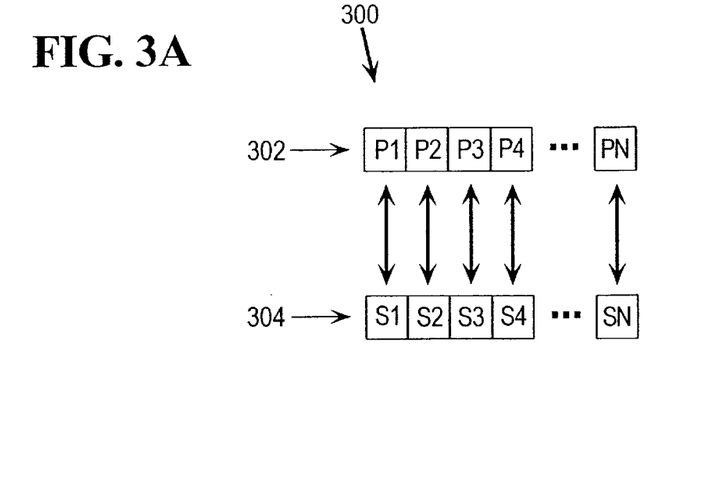
FIG. 3A is a block diagram illustrating comparing a phoneme string representation of an expected pronunciation of word to a first actual pronunciation of a word according to an embodiment.
Figure 3B:
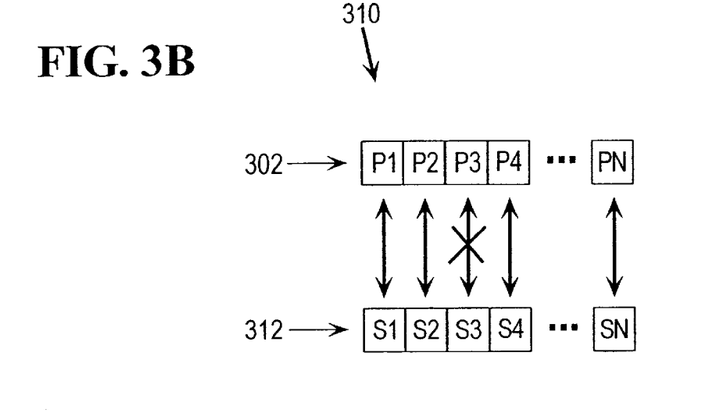
FIG. 3B is a block diagram illustrating comparing a phoneme string representation of an expected pronunciation of word to a second actual pronunciation of a word according to an embodiment.
Figure 3C:
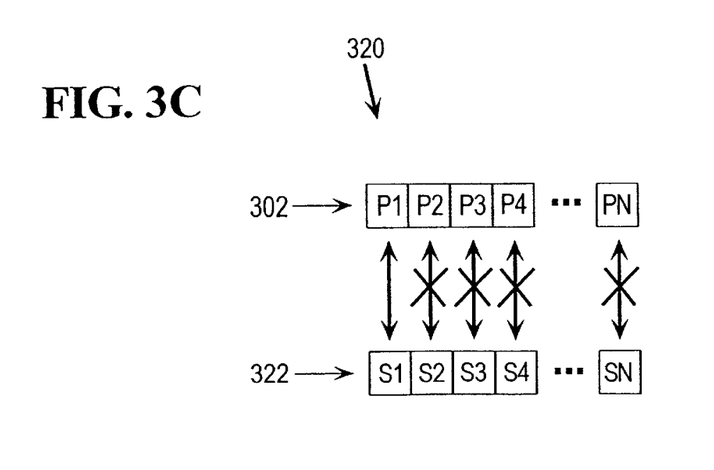
FIG. 3C is a block diagram illustrating comparing a phoneme string representation of an expected pronunciation of word to a third actual pronunciation of a word according to an embodiment.

FIG. 3A, FIG. 3B, and FIG. 3C are block diagrams 300, 310, 320, respectively, that illustrate an approach for automatically determining the accuracy of an expected pronunciation representation from a pronunciation dictionary according to an embodiment. Phoneme string 302 represents an expected pronunciation of a particular word and includes phonemes P1, P2, P3, P4 through PN.

According to an embodiment, phoneme string 302 is compared to a first actual pronunciation of the particular word on a phoneme-by-phoneme basis to determine how well the expected pronunciation of the particular word compares estimates the first actual pronunciation of the particular word. The first actual pronunciation of the particular word is projected onto phoneme string 302 and a set of scores S1, S2, S3, S4 . . . SN, represented by reference numeral 304, are determined. Each score indicates a correlation between a particular phoneme and the first actual pronunciation. For example, in FIG. 3A, score S1 is indicative of the correlation between phoneme P1 and the first actual pronunciation. A high score typically indicates a higher correlation than a relatively lower score. For example, a score of (0.90) may indicate a relatively higher correlation between a particular phoneme and an actual pronunciation than a score of (0.30). In the example in FIG. 3A, the first actual pronunciation of the particular word very closely matches the expected pronunciation of the particular word, represented by phoneme string 302. The close match is reflected in a relatively high set of scores S1, S2, S3, S4 . . . SN. Thus, it is likely that phoneme string 302 will be useful to recognizer 108 (FIG. 1) for recognizing the first actual pronunciation of the particular word.

In the block diagram 310 of FIG. 3B, the expected pronunciation is evaluated against a second actual pronunciation of the particular word. In this example, the expected pronunciation has a high correlation to the second actual pronunciation except with respect to phoneme P3, as indicated by score S3. Thus, score S3 is a relatively lower score than, for example, score S1. The relatively lower score for score S3 compared to score S2 indicates that phoneme P3 was not as strongly represented as phoneme P1 in the second actual pronunciation of the particular word. Nevertheless, since the expected pronunciation scored well with respect to most of the phonemes, it is likely that phoneme string 302 will be useful to recognizer 108 (FIG. 1) for recognizing the second actual pronunciation of the particular word.

In the block diagram 320 of FIG. 3C, the expected pronunciation is evaluated against a third actual pronunciation of the particular word. In this example, it is assumed that the expected pronunciation, represented by phoneme string 302, does not score well with respect to the third actual pronunciation of the particular word. That is, that there is a relatively low correlation between the phonemes contained in phoneme string 302 and the third actual pronunciation of the particular word. The consequence of the significant differences between the expected pronunciation and the third actual pronunciation is that phoneme string 302 is unlikely to be useful to recognizer 108 (FIG. 1) for recognizing the third actual pronunciation of the particular word.

B. SCORING PHONEME STRINGS

Once phoneme strings from a pronunciation dictionary have been compared to actual pronunciations of words, the phoneme strings are scored for accuracy. According to one embodiment, the accuracy of a particular phoneme string with respect to a particular actual pronunciation is based upon the scores for each phoneme contained in the expected phoneme string. For example, in FIG. 3A, expected phoneme string 302 might receive a score of (1.00) to indicate that the first actual pronunciation very closely matched the expected pronunciation. In FIG. 3B, the second actual pronunciation did not match the expected pronunciation as well. Accordingly, expected phoneme string 302 would receive a relatively lower score with respect to the second actual pronunciation, for example (0.80) or (0.90). In FIG. 3C, the third actual pronunciation very poorly matched the expected pronunciation. Accordingly, expected pronunciation string 302 would receive a relatively low score with respect to the third actual pronunciation, for example, (0.10) or (0.20).

Once a particular phoneme string has been scored for one or more actual pronunciations, the scores are evaluated against specified accuracy criteria to determine whether the particular phoneme string needs to be updated to more accurately reflect actual pronunciations of the associated word. According to one embodiment, the specified accuracy criteria includes a minimum average score threshold that corresponds to a minimum average correlation between phonemes and one or more actual pronunciations. If the average score for a particular phoneme with respect to one or more actual pronunciations is less than the minimum average score threshold, then the phoneme string associated with the particular phoneme does not satisfy the specified accuracy criteria and needs to be updated to more accurately reflect actual pronunciations of the corresponding word.

According to another embodiment, the specified accuracy criteria includes a minimum score threshold that specifies the minimum acceptable score (correlation) for a particular phoneme with respect to any actual pronunciations. If the score for the particular phoneme with respect to any actual pronunciation is less than the minimum score threshold, then the phoneme string associated with the particular phoneme does not satisfy the specified accuracy criteria and needs to be updated to more accurately reflect actual pronunciations of the corresponding word. The minimum score threshold may also require that a specified number or fraction of scores meet or exceed the minimum score threshold for the accuracy criteria to be satisfied.

Figure 4:
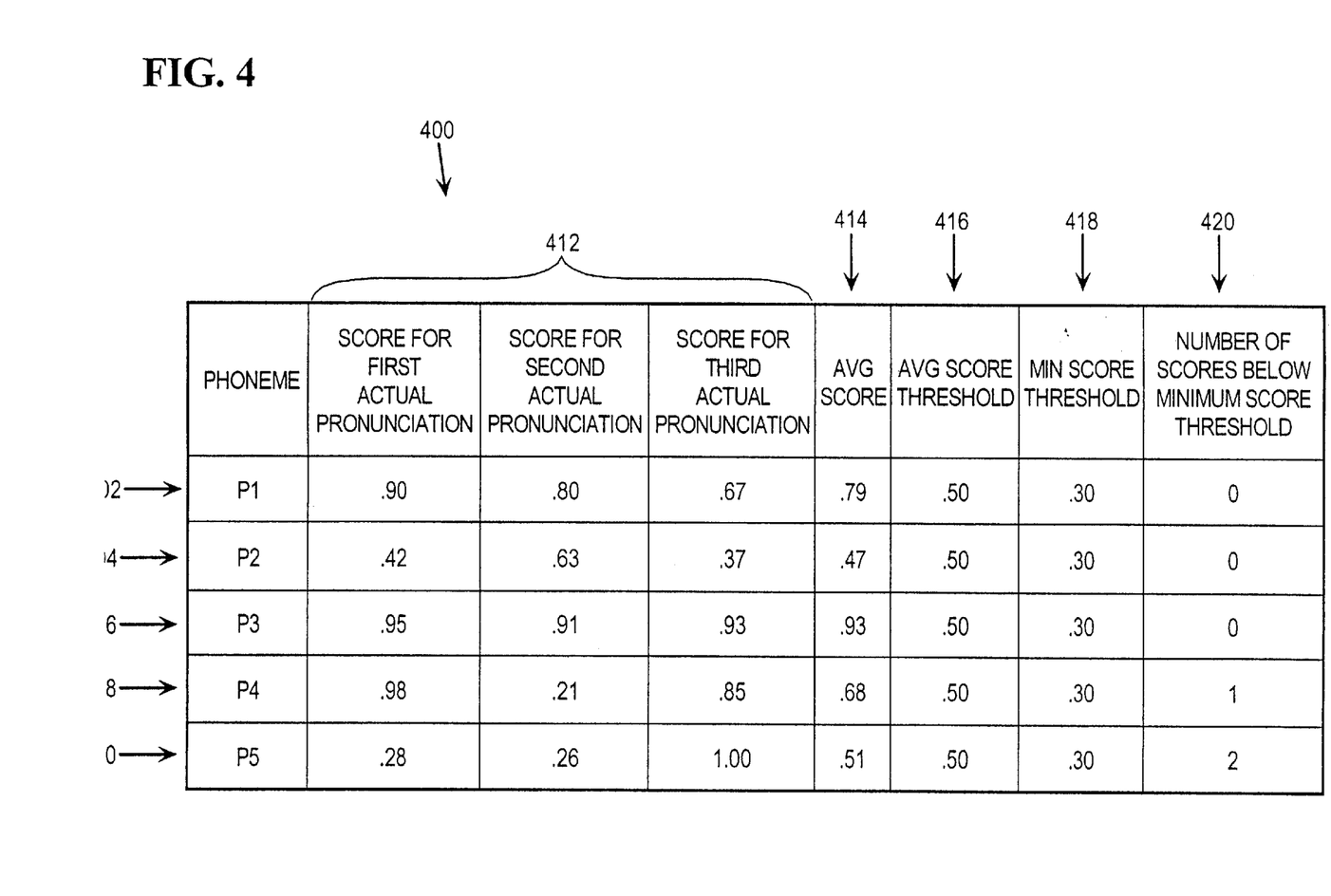
FIG. 4 is a table illustrating determining an accuracy score for phoneme strings according to an embodiment.

The scoring of phoneme strings is now described in more detail with reference to a table 400 of FIG. 4. In general, table 400 contains the results of evaluating a particular phoneme string for a particular word, consisting of phonemes P1, P2, P3, P4 and P5, against three actual pronunciations of the particular word. Table 400 includes five entries 402, 404, 406, 408, 410 that correspond to the testing of the five phonemes P1, P2, P3, P4 and P5, respectively, against three actual pronunciations.

Each phoneme is evaluated against three actual pronunciations, using the approach previously described herein and the results are reported in columns 412. The average score for each phoneme against all three actual pronunciations is reported in column 414 and is calculated from the scores in columns 412. An example minimum average score threshold of (0.50) and an example minimum score threshold of (0.30) are reported in columns 416, 418, respectively, for each phoneme. The number of scores for each phoneme that fall below the minimum score threshold is reported in column 420.

As illustrated by entries 402, 406, corresponding to the first and third phonemes, respectively, the average scores for the first and third phonemes of (0.79) and (0.93), respectively, satisfy the minimum average score threshold of (0.50). Furthermore, none of the scores for the first or third phonemes are below the minimum score threshold of (0.30). Accordingly, both the first and third phonemes satisfy the specified accuracy criteria.

As illustrated by entry 404, corresponding to the second phoneme P2, the average score of (0.47) for the second phoneme P2 falls below the minimum average score threshold of (0.50). Therefore, the second phoneme does not satisfy the specified accuracy criteria.

As illustrated by entries 408, 410, corresponding to the fourth and fifth phonemes, respectively, the average scores for both the fourth and fifth phonemes of (0.68) and (0.61), respectively, satisfy the minimum average score threshold of (0.50). However, the fourth and fifth phonemes have one and two scores, respectively, that fall below the minimum score threshold. Accordingly, the fourth and fifth phonemes cause the particular phoneme string to not satisfy the specified accuracy criteria. This example illustrates different techniques that may be applied to evaluate the scores for phonemes in a phoneme string. It is understood that the score for a single phoneme may cause the associated phoneme string to be updated. For example, since the average score of (0.47) for phoneme P2 falls below the average score threshold of (0.50), the associated phoneme string needs to be updated and the scores for the other phonemes do not have to be evaluated.

This example assumes that under the specified accuracy criteria, a single score below the minimum score threshold will not satisfy the specified accuracy criteria. In other circumstances, the specified accuracy criteria may specify that a particular number of scores below the minimum score threshold causes a phoneme string to fail the specified accuracy criteria. For example, the specified accuracy criteria may specify that only a phoneme string that has two or more phoneme scores below the minimum score threshold does not satisfy the specified accuracy criteria. Under these circumstances, the scores for the fourth phoneme would not cause the particular phoneme string to not satisfy the specified accuracy criteria, but the scores for the fifth phoneme would.

Figure 5:
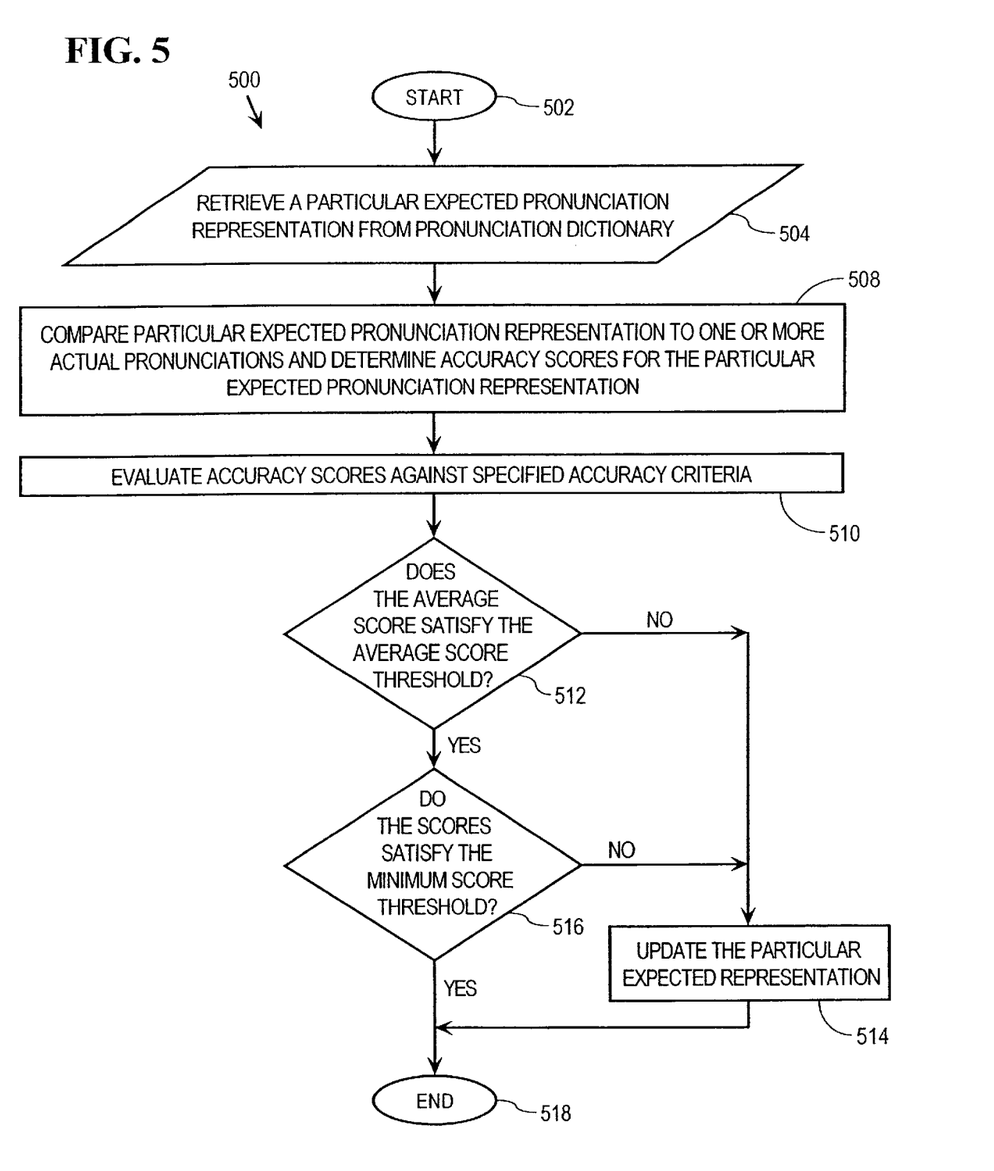
FIG. 5 is a flow diagram of a process for automatically determining the accuracy of a pronunciation dictionary according to an embodiment.

The approach for determining the accuracy of a particular expected pronunciation from a pronunciation dictionary in a speech recognition system is now described with reference to both table 400 of FIG. 4 and a flow diagram 500 of FIG. 5. After starting in step 502, in step 504, a particular expected pronunciation representation is retrieved from a pronunciation dictionary, for example, pronunciation dictionary 112 of FIG. 1. Expected representations contained in pronunciation dictionary 112 may be selectively retrieved and evaluated or systematically retrieved and evaluated as part of a regular pronunciation dictionary "tuning" procedure.

In step 508, the particular expected pronunciation representation is compared to the one or more actual pronunciations and accuracy scores are determined for the particular expected pronunciation. For example, as indicated by table 400, the phonemes in the particular pronunciation representation are evaluated against three actual pronunciations. An accuracy score is determined for each phoneme with respect to each actual pronunciation based upon how well the actual pronunciations correlate to the phonemes. For example, an average accuracy score of (0.79) for the first phoneme with respect to the three actual pronunciations is stored in column 414.

In step 510, the accuracy scores are evaluated against specified accuracy criteria. For example, the average accuracy score for the first phoneme of (0.79) is compared to the minimum average score threshold of (0.50) in column 416. In addition, the accuracy scores or the first phoneme with respect to the three actual pronunciations of (0.90), (0.80) and (0.67), respectively, are compared to the minimum score threshold of (0.30) from column 18.

In step 512, a determination is made whether the average score satisfies the minimum average score threshold. If not, then the particular expected pronunciation representation does not satisfy the specified accuracy criteria and in step 514, the particular expected representation is updated. For example, the average accuracy score of (0.47) for the second phoneme P2, as represented by entry 404, is below the average score threshold of (0.50).

If in step 512, the average score does satisfy the minimum average score threshold, then in step 516, a determination is made whether the accuracy scores for the particular expected pronunciation representation satisfy the minimum score threshold. As previously described, if N number of the accuracy scores for the particular expected pronunciation representation fall below the minimum score threshold, then the specified accuracy criteria are not satisfied. If not, then control proceeds to step 514 where the particular expected representation is updated to reflect the actual pronunciations of the corresponding word. For example, the fourth phoneme has one accuracy score below the minimum score threshold while the fifth phoneme has two accuracy scores below the minimum score threshold. If, however, in step 516, the accuracy scores satisfy the minimum score threshold, then the specified accuracy criteria are satisfied. The process is then complete in step 518.

Although embodiments have been primarily described herein in the context of determining the accuracy of expected pronunciations of words, the approach described herein may be used with any type of utterance and the invention is not limited to the context of words.

5. Implementation Mechanisms

A. OVERVIEW

The approach described herein for automatically determining the accuracy of a pronunciation dictionary in a speech recognition system may be implemented in computer software, in hardware circuitry, or as a combination of computer software and hardware circuitry. Accordingly, the invention is not limited to a particular computer software or hardware circuitry implementation. For example, as illustrated in FIG. 1, the approach may be implemented in pronunciation diagnostic tool 114 as part of SRS 104. As another example, the approach may be implemented as part of recognizer 108. The approach may also be implemented as a stand-alone mechanism located external to SRS 104 that is periodically used to assess the accuracy of pronunciation dictionary 112 and provide recommendations for expected pronunciation representations in pronunciation dictionary 112 that do not satisfy the specified accuracy criteria.

B. IMPLEMENTATION HARDWARE

Figure 6:
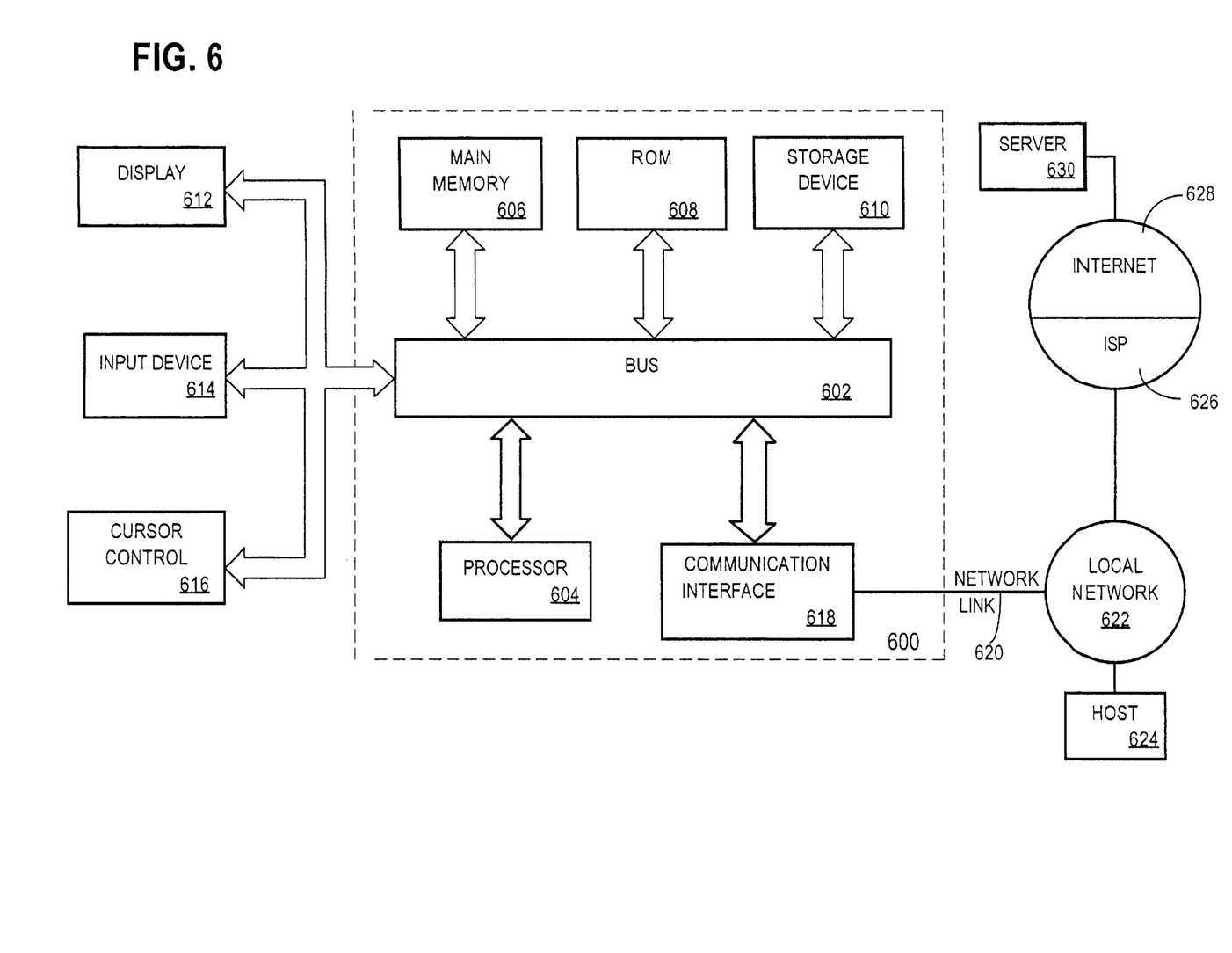
FIG. 6 is a block diagram of a computer system on which embodiments may be implemented.

FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled by bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for automatically determining the accuracy of a pronunciation dictionary. According to one embodiment of the invention, a mechanism for automatically determining the accuracy of a pronunciation dictionary is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for automatically determining the accuracy of a pronunciation dictionary as described herein.

The received code may be executed by processor 604 as it is received, and/or stored in storage device 610, or other non-volatile storage for later execution. In this manner, computer system 600 may obtain application code in the form of a carrier wave.

The approach described in this document for automatically determining the accuracy of a pronunciation dictionary provides several benefits and advantages over prior approaches. In particular, the use of an automated mechanism reduces the amount of human resources required to determine the accuracy of a pronunciation dictionary. This allows the accuracy of a pronunciation dictionary to be periodically assessed and corrected without having to wait for users to identify problems with particular words. Moreover, the automated approach allows a pronunciation dictionary to be more quickly updated to reflect changes to an application, users or context than prior manual approaches. The automated nature of the approach may also increase the accuracy of pronunciation dictionary 112 since: (1) the approach can account for properties of speech recognition system 104; and (2) manually-adjusted pronunciations can be less accurate because of biased linguistic preconceptions.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining the accuracy of a pronunciation dictionary so that the dictionary may be updated to improve its accuracy, comprising:
   providing a pronunciation dictionary having a plurality of entries, wherein each entry includes a word identifier and at least one phoneme string of an expected pronunciation of a word, each phoneme string having a plurality of phonemes;
   receiving a plurality of actual utterances of a specific word from a plurality of users;
   comparing each of the utterances to a phoneme string in the dictionary to generate a corresponding phoneme string score, wherein each phoneme string score indicates on a phoneme-by-phoneme basis the accuracy of the received utterance relative to the compared phoneme string;
   evaluating the phoneme string scores to predetermined accuracy criteria to identify entries in the dictionary that should be updated.

2. The method of claim 1 wherein the phoneme string score has a phoneme score for each phoneme in the phoneme string, each phoneme score being indicative of the correlation between a phoneme in the phoneme string and a corresponding phoneme in the actual utterance.

3. The method of claim 2 wherein the method further comprises
   computing, for each phoneme in the phoneme string, an average phoneme score from the corresponding phoneme scores of each of the actual utterances;
   determining if any of the average phoneme scores is below a threshold value;
   if so, identifying the corresponding entry in the dictionary that has the phoneme string as needing updating.

4. The method of claim 2 wherein the method further comprises comparing the phoneme scores to a minimum score threshold and identifying the corresponding entry in the dictionary that has the phoneme string as needing updating if at least one of the phonemes in the string has a specified number of instances in which the phoneme score is below the minimum score threshold.

5. A computer readable medium carrying one or more sequences of instructions for determining the accuracy of a pronunciation dictionary so that the dictionary may be updated to improve its accuracy, the one or more sequences of instructions including instructions which, when executed by one or more processors, perform the steps of:
   providing a pronunciation dictionary having a plurality of entries, wherein each entry includes a word identifier and at least one phoneme string of an expected pronunciation of a word, each phoneme string having a plurality of phonemes;
   receiving a plurality of actual utterances of a specific word from a plurality of users;
   comparing each of the utterances to a phoneme string in the dictionary to generate a corresponding phoneme string score, wherein each phoneme string score indicates on a phoneme-by-phoneme basis the accuracy of the received utterance relative to the compared phoneme string;
   evaluating the phoneme string scores to predetermined accuracy criteria to identify entries in the dictionary that should be updated.

6. The computer readable medium of claim 5 wherein the phoneme string score has a phoneme score for each phoneme in the phoneme string, each phoneme score being indicative of the correlation between a phoneme in the phoneme string and a corresponding phoneme in the actual utterance.

7. The computer readable medium of claim 6 wherein the instructions further perform the steps of
   computing, for each phoneme in the phoneme string, an average phoneme score from the corresponding phoneme scores of each of the actual utterances;
   determining if any of the average phoneme scores is below a threshold value;

if so, identifying the corresponding entry in the dictionary that has the phoneme string as needing updating.

8. The computer readable medium of claim 6 wherein the instructions further perform the steps of comparing the phoneme scores to a minimum score threshold and identifying the corresponding entry in the dictionary that has the phoneme string as needing updating if at least one of the phonemes in the string has a specified number of instances in which the phoneme score is below the minimum score threshold.

9. A speech recognition diagnostic tool to determine the accuracy of a pronunciation dictionary so that the dictionary may be updated to improve its accuracy, comprising:

a pronunciation dictionary having a plurality of entries, wherein each entry includes a word identifier and at least one phoneme string of an expected pronunciation of a word, each phoneme string having a plurality of phonemes;

logic to receive a plurality of actual utterances of a specific word from a plurality of users;

logic to compare each of the utterances to a phoneme string in the dictionary to generate a corresponding phoneme string score, wherein each phoneme string score indicates on a phoneme-by-phoneme basis the accuracy of the received utterance relative to the compared phoneme string;

logic to evaluate the phoneme string scores to predetermined accuracy criteria to identify entries in the dictionary that should be updated.

10. The speech recognition diagnostic tool of claim 9 wherein the logic to compare includes logic to generate a phoneme string score having a phoneme score for each phoneme in the phoneme string, each phoneme score being indicative of the correlation between a phoneme in the phoneme string and a corresponding phoneme in the actual utterance.

11. The speech recognition diagnostic tool of claim 10 further comprising logic to compute, for each phoneme in the phoneme string, an average phoneme score from the corresponding phoneme scores of each of the actual utterances;

logic to determine if any of the average phoneme scores is below a threshold value and, if so, to identify the corresponding entry in the dictionary that has the phoneme string as needing updating.

12. The speech recognition diagnostic tool of claim 10 further comprising logic to compare the phoneme scores to a minimum score threshold and to identify the corresponding entry in the dictionary that has the phoneme string as needing updating if at least one of the phonemes in the string has a specified number of instances in which the phoneme score is below the minimum score threshold.

* * * * *